Nov. 12, 1963 R. Q. ANDERSON 3,110,535
METAL CABINET FRAMEWORK AND PANEL STRUCTURE
Filed Oct. 6, 1961 2 Sheets-Sheet 1
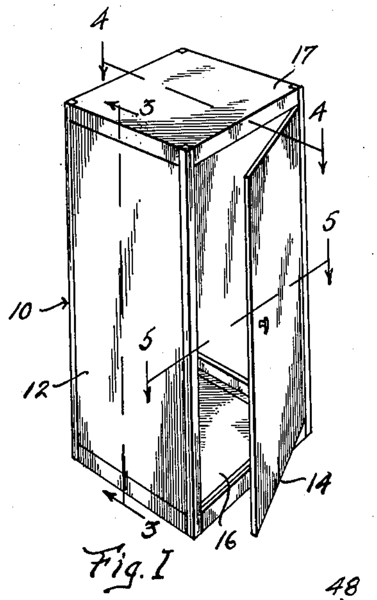
Fig. I
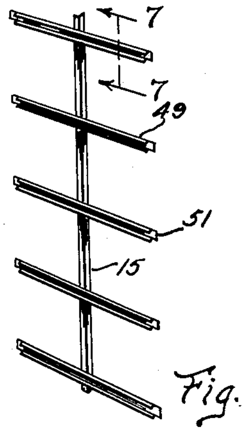
Fig. 2
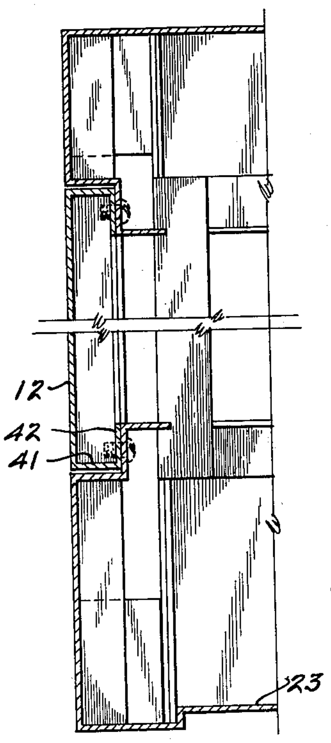
Fig. 3
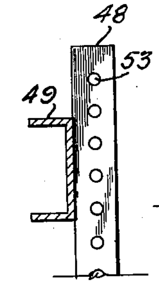
Fig. 7
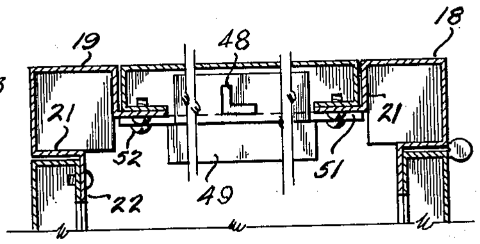
Fig. 4
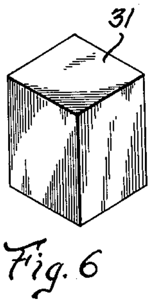
Fig. 6
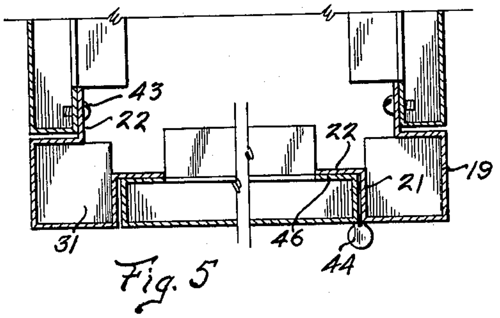
Fig. 5
INVENTOR
R. Quintus Anderson
BY Richard S. Hays
ATTORNEY Nov. 12, 1963 R. Q. ANDERSON 3,110,535

METAL CABINET FRAMEWORK AND PANEL STRUCTURE

Filed Oct. 6, 1961 2 Sheets-Sheet 2

INVENTOR
R. Quintus Anderson

BY Richmond S. Hayes
ATTORNEY

United States Patent Office 3,110,535

Patented Nov. 12, 1963

3,110,535
METAL CABINET FRAMEWORK AND PANEL STRUCTURE

Raymond Quintus Anderson, Jamestown, N.Y., assignor to Dahlstrom Manufacturing Corp., Jamestown, N.Y., a corporation of New York Filed Oct. 6, 1961, Ser. No. 143,470
2 Claims. (Cl. 312—350)

This invention relates to improvements in cabinets and more particularly to structure of cabinets intended to contain various units of electronic equipment. Such equipment is of many sizes and shapes and may include assembled panels, pull out chassis, wall mounted units, etc.

In its present form, the invention has been designed to meet a wide range of electronic housing requirements without in any way so compacting or confining the units as to render them difficult to install, remove, or modify, as might be required from time to time.

The present cabinet includes an arrangement of structural elements that provides maximum flexibility as to length, width, or height whereby to accommodate variously shaped and sized units, the cabinet structural elements being such that ordinarily available tools may be used in their assembly.

Furthermore, as the structural details of the cabinet are presented, it will be apparent that the assembled cabinet frame is rugged, well braced, and capable of readily receiving panels, doors, or other structure suitable for the convenient and accessible mounting of electronic equipment. In this connection, it is important to note that practically all electronic equipment is very compact, unit by unit, and is of considerable weight. Any cabinet in which such equipment is intended to be housed must therefore be extremely sturdy, if the various units so housed are to be maintained in their proper physical and electrical association.

The invention has for its objects the provision of a sturdy cabinet that is not only easily assembled into a rugged whole, but includes such structural design as to render it adaptable for containing a wide variety of electronic units in coordinated relationship.

Other objects and advantages of the invention will be clearly apparent from a consideration of the following specification, together with the accompanying drawings; and in which:

FIG. 1 is a perspective view of a cabinet embodying one form of the invention and shows an access door in partially opened position;

FIG. 2 is a perspective view of one form of rack to be secured in the cabinet whereby to mount various drawers or panels;

FIG. 3 is an enlarged fragmentary vertical sectional view, taken substantially as suggested by the line 3—3 of FIG. 1 and shows the top and bottom cabinet frame details, together with a mounted side panel;

FIG. 4 is a fragmentary horizontal sectional view taken on the line 4—4 of FIG. 1 and shows one of the racks and a wall panel secured to the cabinet frame;

FIG. 5 is a fragmentary horizontal sectional view taken substantially on the line 5—5 of FIG. 1 and shows details of the structure at the door opening;

FIG. 6 is a perspective view of one of the reinforcing corner blocks utilized to rigidify the cabinet frame;

FIG. 7 is an enlarged fragmentary vertical sectional view of a part of the rack shown in FIG. 2 and is taken substantially on the line 7—7 of that figure;

Figures 8, 9, 10:
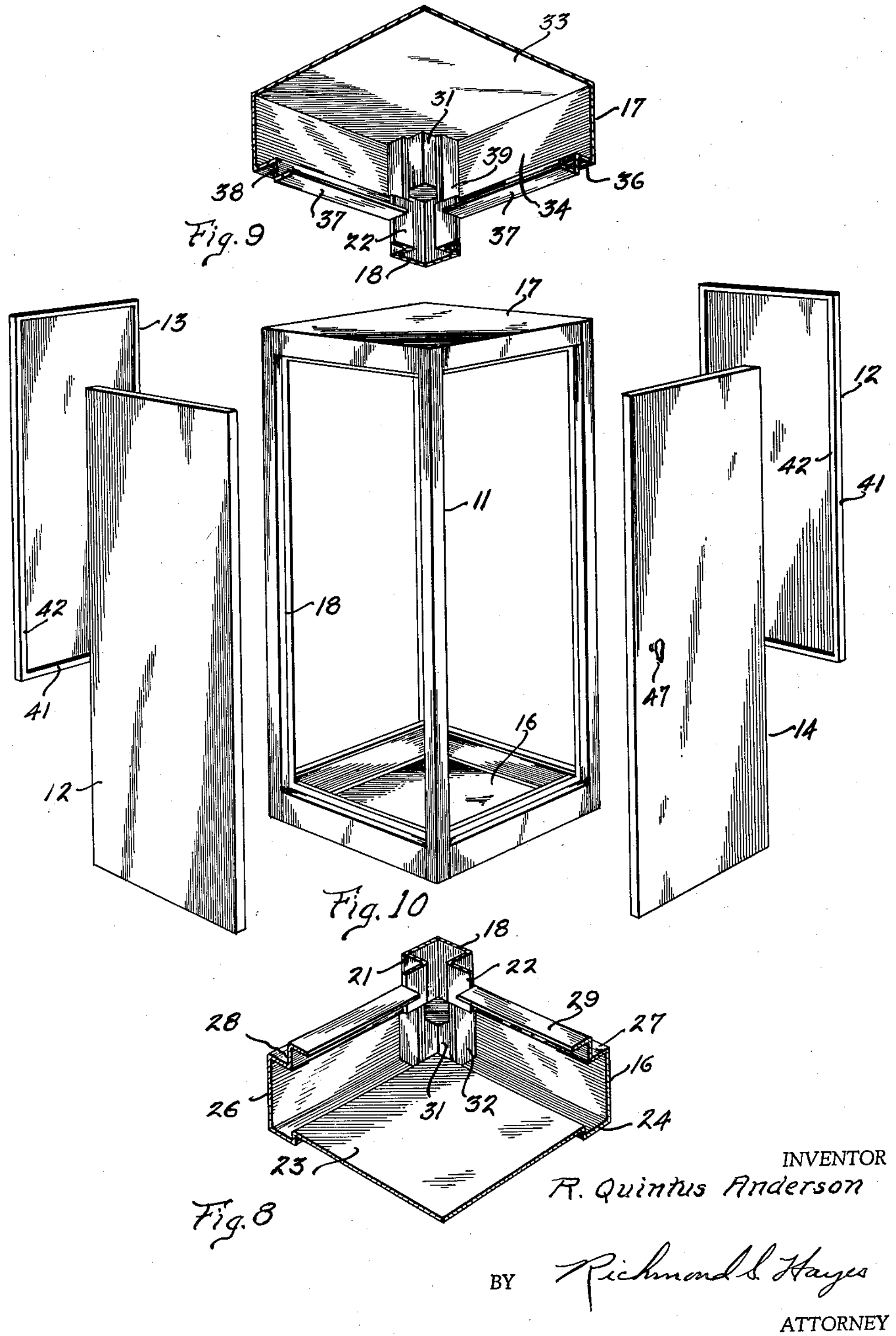
FIG. 8 is a fragmentary perspective view showing the frame base and one corner post.
FIG. 9 is a fragmentary perspective view showing the frame top and one corner post.
FIG. 10 is an exploded perspective view of the cabinet framing the panels and door.

Referring more particularly to the drawings, the reference numeral 10 is employed to generally designate a cabinet embodying one form of the invention. This cabinet consists of several readily assembled parts; namely, a frame 11, side panels 12, rear panel 13, door 14, and an interior rack or racks 15. Of course, the frame 11 includes a base 16 and top 17.

Attention is now more specifically directed to the structure of the frame 11. Inasmuch as the cabinet shown is square in its horizontal dimensions, the frame will naturally also be square and it includes four identical corner posts 18. As may be observed in FIGS. 4 and 5, each corner post consists of integral right angle sides 19, the edges of which continue in flanges 21 which partially complete the horizontal square shape of the post. The flanges 21 continue in reversed right angle flanges 22. Further views of the post structure appear in FIGS. 8 and 9.

The base 16 of the frame 11 consists of a bottom wall 23 which is marginally defined by downwardly offset rigidifying channels 24. The outer edges of these channels consist of vertical walls 26 which terminate in horizontal, inward ledges or flanges 27. From the ledges 27, short vertical flanges 28 continue and terminate in inwardly disposed horizontal flanges 29. As may be observed in FIG. 10, the ledges 27 and flanges 28 serve as locaters for panels 12 and 13 and marginal stop for the door 14.

In the present disclosure of the base, the innermost flanges 29 are cut away sufficiently at their ends to allow the vertical flanges 22 of the post to abut the inner surfaces of flanges 28 and these abutting portions of the base and post may be secured by welding or in some other manner, so long as the securing means renders the joined parts rigid. As may be noted in FIG. 8, a block 31, such as shown in FIG. 6, is mounted in the lower end of the post 18 and, when suitably joined to the post flanges and inturned end flanges 32 of walls 26, provides an extremely sturdy and rigid manner of securing the post ends to the base 16. In other words, the connection of the posts with the base is such as to resist any relative distortion or twisting.

Attention is now directed to the structure of the top 17 as shown in FIG. 9. Herein a top wall 33 is provided which is marginally defined by depending sides 34. The lower edges of these sides terminate in inwardly set ledges 36 and 37, connected by a vertical flange 38. The end flanges 39 of the sides 34, similarly to flanges 32 above described with respect to the base 16, abut the innermost flanges 22 of the post 18 and, when another of the blocks 31 is mounted in the upper end of the post—that is, with the block's upper end against the top wall 33—these parts may be made virtually integral by suitable securing means, such, for example, as welding. The ledge 37 is of course cut away to clear the innermost flanges 22 of the post and, in fact, this portion of the structure is identical, in reverse, to the structure already described in connection with the base 16. Similarly, the ledge 36 and flange 38 provide top locaters for panels 12 and 13 and a top marginal stop for the door 14. When the base and top 16 and 17, respectively, have been secured to the four posts 18, the frame 11 has the appearance of the structure shown in FIG. 10.

As may be seen in FIGS. 3 and 4, the panels 12 and 13 are marginally defined by inturned flanges 41 which in turn terminate in return-bent flanges 42. The top and bottom flanges 42 of each panel abut the flanges 28 and 38 of the base and top and are secured thereto in any suitable manner, as by screws 43. The flanges 42, along the sides of each panel, are designed to abut the innermost flanges 22 of the post 18 and these parts may also be secured by the screws 43, substantially as shown. The door 14 is provided with one or more suitable hinges 44 which are joined to one of the posts 18. The door, being substantially identical in structure with the panels 12 and 13, the innermost flanges 42 thereof will, when the door is moved into closed position, abut the innermost post flanges 22 and flanges 28 and 38 of the base and top. Any suitable latching member, such as suggested at 47, will secure the door in closed position.

The rack 15 is intended to be mounted within the cabinet and, in general, provides selective areas within the cabinet for mounting and supporting units of different sizes. Although it is contemplated that racks of the type shown in FIG. 2 may be somewhat varied, they will, in general, include a vertically extending angle bar 48, to which are attached transversely extending channels 49. The base wall of each of these channels continues somewhat beyond the side walls thereof to provide tabs 51. As may be seen iin FIG. 4, the channels 49, together with their end tabs 51, span the distance between the innermost flanges 22 of adjacent posts 18. The tabs are secured to the flanges 22 in any suitable manner, as by screws 52. The angle bar 48 in general provides a central rigidity for the rack and, when the tabs are secured to the posts 18, the rack virtually becomes an integral part of the cabinet frame 11.

It may be readily appreciated that when two racks 15 are placed at opposite sides of the frame, they provide a series of guides into which suitably equipped units or drawers may be slid into place within the cabinet. Such an arrangement greatly simplifies mounting the units and removing them for examination or replacement. Since it is not always exactly known what form the unit supporting brackets may take, or their number and location, it is proposed to provide a series of uniformly distributed tapped openings 53 in at least one of the flanges of each angle bar 48. Thus, where permanency of a unit is desired, any arrangement of brackets on the exterior of such units will be suitable to secure them at any desirable height within the cabinet. If additional tapped openings are provided in the flanges 22 of each post 18 beyond those required to secure the panels, any number or arrangement of racks, identical with or similar to the rack 15, may be mounted in the cabinet by the simple expedient of engaging other screws 52 with the threads of the appropriate openings.

It is particularly pointed out that installation of these racks, or any other suitable supports for electronic units, does not depend on the cabinet manufacturer's previous knowledge of the exact number, shape or size of the units intended to be mounted in the cabinet. In other words, the present invention is adaptable for housing many kinds of units and, by the same token, provides full access to these units after installation, as and when required. For example, should the cabinet shown in FIG. 1 include units carried by the channels of a pair of opposing racks 15, it is conveniently possible to merely reach into the cabinet, remove certain of the screws 43 and then remove one of the panels 12 in order to examine, repair or replace any of the various units carried by the racks.

Although applicant has shown and described a cabinet consisting of a rectangular frame and removable panel and one style of racks for mounting and supporting various electronic units, it will be understood that modifications of the general rectangular proportions of the cabinet, the number and size of the racks and their particular arrangement within the cabinet frame, are considered to be mere variations of the invention insofar as they are embodied in the annexed claims.

Having thus set forth my invention, what I claim as new and for which I desire protection by Letters Patent is:

1. A cabinet comprising a rectangular frame consisting of hollow corner posts having longitudinal side flanges defining outwardly exposed ledges, top and bottom enclosing members, vertical end flanges on said members engaged with the end portions of said post side flanges, rectangular blocks located in the upper and lower ends of said posts in the area of the engagement of said members with said posts and means permanently joining these elements whereby to produce a rigid frame, other flanges on said members cooperating with the flanges of said posts to define rectangular openings in the sides of said frame, all of said flanges further defining said openings by marginal and depth limits for a set of removably secured side panels, and one or more racks located within said frame joined to the side flanges of said posts and providing means for suspending various electronic units in appropriate orientation.

2. A cabinet comprising a rectangular frame consisting of hollow corner posts having longitudinal side flanges defining outwardly exposed ledges, top and bottom enclosing members secured to the end portions of the flanges of said posts, rectangular blocks fitted into the upper and lower ends of said posts in the areas defined cooperatively by flanges of said posts and said members, said blocks being permanently joined to the respective contacting flanges and said top and bottom members whereby to create a rigid frame, flanges on said members cooperating with said post flanges to form rectangular openings in the sides of said frame, panels mounted in and closing said openings whereby to complete said cabinet, removable means accessible from the interior of said cabinet for securing said panels to the flanges of said posts, racks in said frame, said racks having at least one intermediate supporting element and suitably spaced horizontal channels, corresponding channels on opposite sides of said frame providing slidable drawer-like mounting for the insertion or removal of various electronic units, and means securing the ends of the channels of each rack to flanges of an adjacent pair of posts whereby to utilize said racks as an added rigidifier to said frame.

References Cited in the file of this patent

UNITED STATES PATENTS

| | | |
|---|---|---|
| 2,058,263 | Rosendale | Oct. 20, 1936 |
| 2,167,525 | Rosendale | July 25, 1939 |
| 2,822,231 | Golz et al. | Feb. 4, 1958 |
| 2,831,745 | Parmet | Apr. 22, 1958 |
| 2,991,140 | Anderson et al. | July 4, 1961 |
| 3,050,194 | Sinninger | Aug. 21, 1962 |
| 3,075,818 | Fay | Jan. 29, 1963 |